United States Patent
Hong et al.

(10) Patent No.: US 11,323,164 B2
(45) Date of Patent: May 3, 2022

(54) COMMUNICATION METHOD AND APPARATUS IN CLOUD RADIO ACCESS NETWORK

(71) Applicant: ELECTRONICS AND TELECOMMUNICATIONS RESEARCH INSTITUTE, Daejeon (KR)

(72) Inventors: Seung Eun Hong, Daejeon (KR); In Kyeong Choi, Daejeon (KR); Tae Gyun Noh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/069,100

(22) Filed: Oct. 13, 2020

(65) Prior Publication Data
US 2021/0126682 A1    Apr. 29, 2021

(30) Foreign Application Priority Data

Oct. 24, 2019   (KR) ........................ 10-2019-0133280
Sep. 28, 2020   (KR) ........................ 10-2020-0125477

(51) Int. Cl.
*H04B 7/02*   (2018.01)
*H04B 7/0456*   (2017.01)
(Continued)

(52) U.S. Cl.
CPC ........... *H04B 7/0456* (2013.01); *H04B 7/024* (2013.01); *H04B 7/0626* (2013.01); *H04B 7/0639* (2013.01)

(58) Field of Classification Search
CPC .... H04B 7/0456; H04B 7/024; H04B 7/0626; H04B 7/0639; H04B 7/0617
(Continued)

(56) References Cited

U.S. PATENT DOCUMENTS 9,112,758 B2 *   8/2015   Niu ...................... H04L 27/2628
9,439,096 B2 *   9/2016   Josiam ................. H04B 7/0408
(Continued)

FOREIGN PATENT DOCUMENTS

WO    2015/081277 A1    6/2015
WO    2018/119153 A2    6/2018

OTHER PUBLICATIONS

Joint Design of Fronthauling and Hybrid Beamforming for Downlink C-RAN Systems, Jaein Kim, Seok-Hwan Park, Member, IEEE, Osvaldo Simeone, Inkyu Lee, and Shlomo Shamai (Shitz), arXiv:1902.10873v2 [cs.I T] Mar. 14, 2019, pp. 1-12.*
(Continued)

*Primary Examiner* — Helene E Tayong
(74) *Attorney, Agent, or Firm* — LRK Patent Law Firm

(57) ABSTRACT

An operation method of a first AN for a hybrid beamforming-based cooperative transmission in a C-RAN includes obtaining a spatial channel covariance with terminals subject to a service; selecting a set of terminals to be serviced from among the terminals subject to the service; determining a radio frequency (RF) precoding matrix by which interference between the terminals to be serviced is minimized; transferring information on the determined RF precoding matrix to a centralized processor (CP); and generating an effective channel by configuring an RF precoder based on the determined RF precoding matrix.

19 Claims, 7 Drawing Sheets

(51) Int. Cl.
*H04B 7/024* (2017.01)
*H04B 7/06* (2006.01)

(58) Field of Classification Search
USPC .......................................................... 375/267
See application file for complete search history.

(56) References Cited

U.S. PATENT DOCUMENTS

| | | | |
|---|---|---|---|
| 9,503,934 B2* | 11/2016 | Ma | H04B 7/024 |
| 10,256,870 B2 | 4/2019 | Ma et al. | |
| 10,499,355 B2 | 12/2019 | Chang et al. | |
| 10,555,213 B2 | 2/2020 | Cho et al. | |
| 10,560,958 B2 | 2/2020 | Noh et al. | |
| 10,567,066 B2 | 2/2020 | Jeon et al. | |
| 2010/0273514 A1* | 10/2010 | Koo | H04B 7/024 |
| | | | 455/501 |
| 2014/0044044 A1* | 2/2014 | Josiam | H04B 7/063 |
| | | | 370/328 |
| 2015/0103934 A1* | 4/2015 | Nam | H04B 7/0639 |
| | | | 375/260 |
| 2015/0365143 A1* | 12/2015 | Chai | H04B 7/0452 |
| | | | 455/101 |
| 2017/0164143 A1 | 6/2017 | Huang et al. | |
| 2017/0208613 A1* | 7/2017 | Nam | H04B 7/0634 |
| 2018/0076871 A1* | 3/2018 | Rahman | H04B 7/0634 |
| 2019/0020435 A1* | 1/2019 | Nishimoto | H04J 11/00 |
| 2019/0260459 A1* | 8/2019 | Jeon | H04B 7/0473 |

OTHER PUBLICATIONS

Guillem Femenias et al., "Cell-free millimeter-wave massive MIMO systems with limited fronthaul capacity", IEEE Access, vol. 7, 2019.

* cited by examiner

COMMUNICATION METHOD AND APPARATUS IN CLOUD RADIO ACCESS NETWORK

CROSS-REFERENCE TO RELATED APPLICATIONS

This application claims priority to Korean Patent Applications No. 10-2019-0133280 filed on Oct. 24, 2019 and No. 10-2020-0125477 filed on Sep. 28, 2020 in the Korean Intellectual Property Office (KIPO), the entire contents of which are hereby incorporated by reference.

BACKGROUND

1. Technical Field

The present disclosure relates to a cloud radio access network (C-RAN) system, and more particularly, to a method for interference management and cooperative transmission, which can increase traffic capacity while considering a fronthaul capacity constraint in the C-RAN system, and an apparatus for the same.

2. Description of Related Art

In order to accommodate the explosive increase of mobile traffic, use of a high frequency (e.g., millimeter wave, terahertz) band capable of securing a wider bandwidth, use of more antennas to improve frequency efficiency, and high-density base station/remote radio head (RRH) deployment technologies for achieving a cell-splitting gain have been utilized. The increasing trend of mobile traffic will continue, and accordingly, application levels of the above technologies need to be continuously enhanced.

SUMMARY

Accordingly, exemplary embodiments of the present disclosure provide an operation method of an access node (AN) performing cooperative transmission for a user terminal in a dense environment by utilizing centralized signal processing while considering a fronthaul capacity constraint of a C-RAN architecture to which a function splitting technique is applied. Accordingly, exemplary embodiments of the present disclosure also provide an operation method of a centralized processor (CP) controlling ANs to perform cooperative transmission for a terminal in the C-RAN architecture to which a function splitting technique is applied. Accordingly, exemplary embodiments of the present disclosure also provide a C-RAN system performing hybrid-beamforming based cooperative transmission, which is composed of the ANs and the CP.

According to exemplary embodiments of the present disclosure, an operation method of a first access node (AN) for a hybrid beamforming-based cooperative transmission in a cloud radio access network (C-RAN) may comprise: obtaining a spatial channel covariance with terminals subject to a service; selecting a set of terminals to be serviced from among the terminals subject to the service; determining a radio frequency (RF) precoding matrix by which interference between the terminals to be serviced is minimized; transferring information on the determined RF precoding matrix to a centralized processor (CP); and generating an effective channel by configuring an RF precoder based on the determined RF precoding matrix.

The spatial channel covariance may be obtained through measurement of an angle of departure (AoD) or an angle of arrival (AoA), and measurement of a path loss.

The set of the terminals to be serviced may be selected from among the terminals subject to the service according to whether each terminal is capable of being provided a high-quality signal from the first AN.

The RF precoding matrix may be a matrix including RF precoding vectors for respective terminals belonging to the set as columns thereof, which minimizes interference between the terminals belonging to the set.

The operation method may further comprise, when the RF precoder is configured only with phase shifter(s), converting the determined RF precoding matrix to an RF precoding matrix to which a constant modulus (CM) is applied, wherein information on the RF precoding matrix to which the CM is applied may be transferred to the CP, and the RF precoder may be configured based on the RF precoding matrix to which the CM is applied.

The information on the determined RF precoding matrix transferred to the CP may be applied to digital precoder design performed in the CP.

When a fronthaul link capacity required between the first AN and the CP needs to be reduced, a linear combination signal to be transmitted through the first AN may be received from the CP by excluding signals for at least a portion of the terminals to be serviced therefrom.

When a fronthaul link capacity required between the first AN and the CP needs to be reduced, at least a portion of RF chains of the first AN may be deactivated by a control of the CP.

Furthermore, according to exemplary embodiments of the present disclosure, an operation method of a centralized processor (CP) for a hybrid beamforming-based cooperative transmission in a cloud radio access network (C-RAN) may comprise: estimating a global instantaneous effective channel between terminals and access nodes (ANs), the ANs being connected to the CP; designing a digital precoder based on the global instantaneous effective channel; and transferring transmission data for each of the ANs, to which the digital precoder is applied, to the each of the ANs through a fronthaul link.

The CP may receive an uplink pilot sequence transmitted by each of the terminals through the ANs, and process the received uplink pilot sequence to estimate the global instantaneous effective channel, and the global instantaneous effective channel may be used as downlink channel information between the ANs and the terminals.

The digital precoder may be designed in a regular zero forcing (RZF) scheme.

The operation method may further comprise receiving information on a radio frequency (RF) precoding matrix from each of the ANs, wherein when a constant modulus (CM) is applied to the RF precoding matrix, the digital precoder may be designed by performing an inverse CM (iCM).

The operation method may further comprise, when a fronthaul link capacity required between a first AN among the ANs and the CP needs to be reduced, excluding signals for at least a portion of terminal(s) from a linear combination signal to be transmitted through the first AN.

The operation method may further comprise, when a fronthaul link capacity required between a first AN among the ANs and the CP needs to be reduced, controlling the first AN to deactivate at least a portion of RF chains of the first AN.

Furthermore, according to exemplary embodiments of the present disclosure, a cloud radio access network (C-RAN) system for performing a hybrid beamforming-based cooperative transmission may comprise a centralized processor (CP); access nodes (ANs) connected to the CP; and fronthaul links connecting the CP and the ANs, wherein the CP may be configured to: estimate a global instantaneous effective channel between terminals and the ANs, design a digital precoder based on the global instantaneous effective channel, and transfer transmission data for each of the ANs, to which the digital precoder is applied, to the each of the ANs through a fronthaul link, and each of the ANs may be configured to: obtain a spatial channel covariance with terminals subject to a service, select a set of terminals to be serviced from among the terminals subject to the service; determine a radio frequency (RF) precoding matrix by which interference between the terminals to be serviced is minimized; transfer information on the determined RF precoding matrix to the CP, an generate an effective channel by configuring an RF precoder based on the determined RF precoding matrix.

The RF precoding matrix may be a matrix including RF precoding vectors for respective terminals belonging to the set as columns thereof, which minimizes interference between the terminals belonging to the set.

When the RF precoder is configured only with phase shifter(s), the determined RF precoding matrix may be converted to an RF precoding matrix to which a constant modulus (CM) is applied, information on the RF precoding matrix to which the CM is applied may be transferred to the CP, and the RF precoder may be configured based on the RF precoding matrix to which the CM is applied.

The CP may receive information on the determined RF precoding matrix from each of the ANs, and design the digital precoder by performing an inverse constant modulus (iCM) when a CM is applied to the determined RF precoding matrix.

The CP may receive an uplink pilot sequence transmitted by each of the terminals through the ANs, and process the received uplink pilot sequence to estimate the global instantaneous effective channel, and the global instantaneous effective channel may be used as downlink channel information between the ANs and the terminals.

The digital precoder may be designed in a regular zero forcing (RZF) scheme.

According to the exemplary embodiments of the present disclosure, a C-RAN system may be constructed with a relatively small fronthaul capacity through function splitting at a low-level PHY function. In addition, distributed individual ANs may perform analog precoding to control interference between user terminals, and a CP may control interference between the distributed ANs through linear digital precoding. In addition, in order to minimize a capacity of linear digital precoded signals in fronthaul transmission, signals transmitted to the ANs through a fronthaul link may be selectively precoded. In addition, RF chains of the distributed ANs may be selectively deactivated to further reduce a load on the fronthaul link.

Through the above-described configuration, consumption of the fronthaul capacity may be minimized, and interference-controlled cooperative transmission may be performed through centralized signal processing for ANs deployed at a high density. In addition, the C-RAN system may be configured using a fronthaul to which light compression or no compression is applied. Accordingly, the capacity of the mobile communication network can be maximized through the dense deployment of the distributed ANs and the cooperative transmission thereof.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
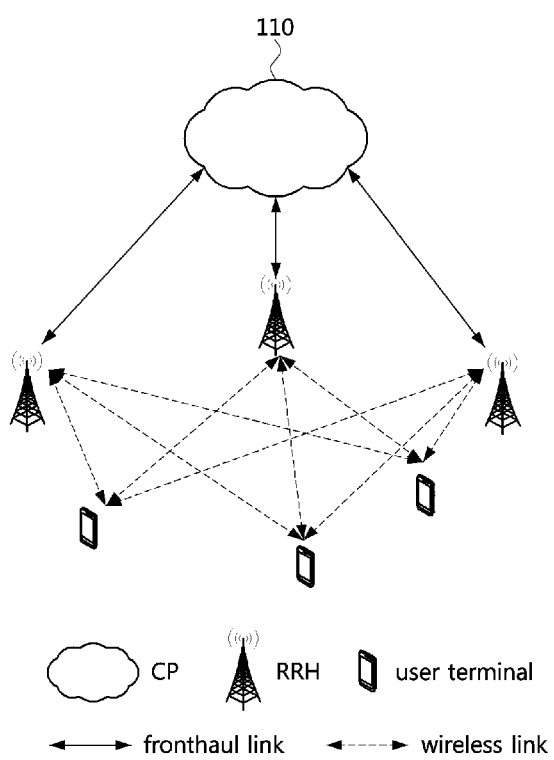
FIG. 1 is a conceptual diagram illustrating an architecture of a cloud radio access network (C-RAN)

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating an architecture of a cloud radio access network (C-RAN).

In the C-RAN architecture shown in FIG. 1, baseband processing, which is performed locally in conventional base stations, may be aggregated in one cloud computing center 110 (hereinafter, a centralized processor (CP)), and may be performed by the CP in a centralized manner.

Unlike the conventional base stations, in the C-RAN architecture, a remote radio head (RRH) may have only radio frequency (RF) and antenna functions. Each of the RRHs and the CP 110 may be connected through a fronthaul link. The fronthaul link should have a low signal propagation delay and have a characteristic of smoothly transferring a large amount of signal. In general, it is known that a fronthaul link requires a capacity up to 20 times a transmission speed of a wireless link. Meanwhile, as the 5G mobile communication system is introduced, the transmission speed of the wireless link is increased to 20 Gbps, and the required fronthaul capacity is difficult to be realistically provided in terms of cost and the like.

Figure 2:
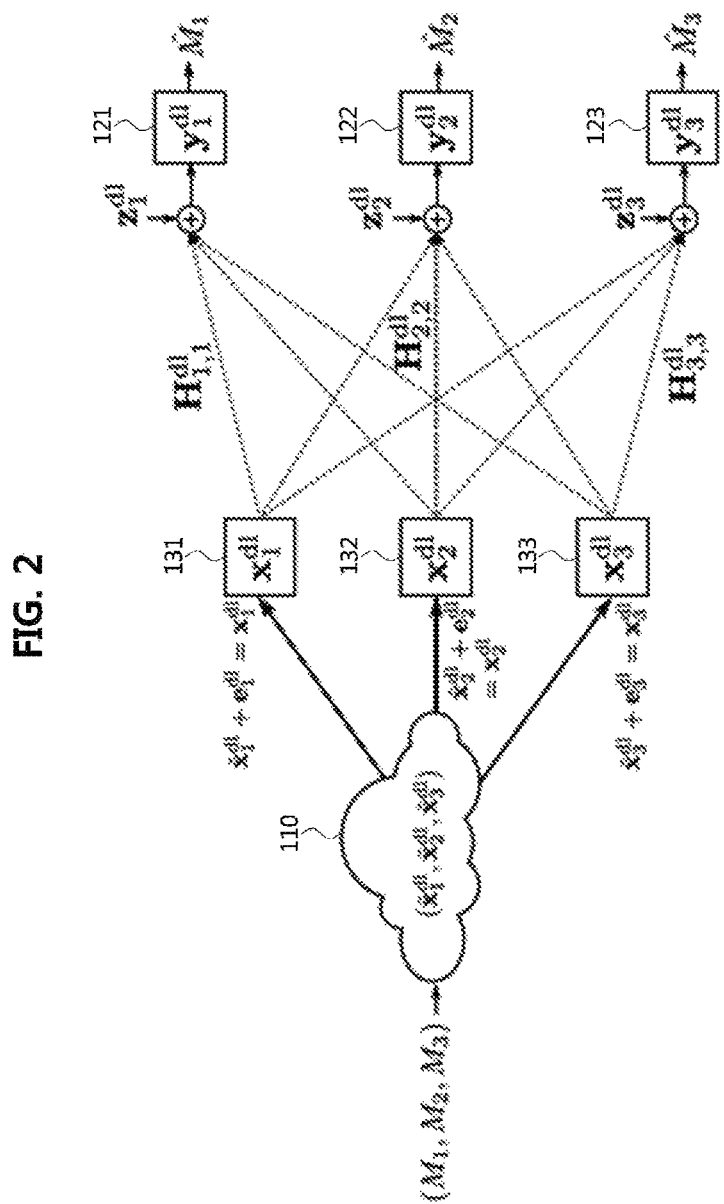
FIG. 2 is a conceptual diagram illustrating a C-RAN architecture to which a compression-based fronthaul transmission scheme is applied.

FIG. 2 is a conceptual diagram illustrating a C-RAN architecture to which a compression-based fronthaul transmission scheme is applied.

Referring to FIG. 2, in the C-RAN architecture, since data $M_1$, $M_2$, $M_3$ to be transmitted to all terminals 121, 122, and 123 are available in the CP 110, the CP 110 may calculate beamformed signals $\hat{x}_1^{dl}$, $\hat{x}_2^{dl}$, $\hat{x}_3^{dl}$ to be transmitted by RRHs 131, 132, and 133 in a centralized manner. The beamformed signals $\hat{x}_1^{dl}$, $\hat{x}_2^{dl}$, $\hat{x}_3^{dl}$ calculated by the CP may theoretically achieve a complete cooperative transmission effect (utilizing all distributed base stations and RRHs). That is, the beamformed signals $\hat{x}_1^{dl}$, $\hat{x}_2^{dl}$, $\hat{x}_3^{dl}$ may be generated based on precoding that control inter-terminal interferences based on channel information, with respect to signals for all the terminals that are simultaneously serviced, and the generated beamformed signals may be transmitted through the distributed RRHs 131, 132, and 133.

On the other hand, a disadvantage of such the scheme is that a transmission capacity required to transfer the signals precoded by the CP 110 to a specific RRH is more than a number of times a capacity of a wireless link for signal transmission through the RRH. Thus, these signals should be compressed before being transmitted over a finite capacity digital fronthaul link. Accordingly, a compression module is required for each fronthaul link in the CP 110, and a decompression module is required for each of the corresponding RRHs 131, 132, and 133. Such the compression process generates quantization noises $e_1^{dl}$, $e_2^{dl}$, $e_3^{dl}$ according to the compression, and the amount of these noises may be variable depending on the available fronthaul capacity. Accordingly, a received signal quality at a terminal may be determined according to a quantization level according to the compression and the precoding for controlling interferences, and a complicated design considering both of the precoding and the quantization is required for achieving a good received signal quality.

Recently, with the introduction of the 5G mobile communication system, the transmission speed of the wireless link increases to 20 Gbps, and the required fronthaul capacity cannot be realistically provided in terms of cost. In order to lower the required fronthaul capacity, a function splitting technique by which a part of baseband function is moved back to an RRH site is being studied. Although the function splitting technique may lower the required fronthaul capacity, functions such as the centralized signal processing should be redistributed, so it is necessary to carefully examine a function splitting point.

Figure 3:
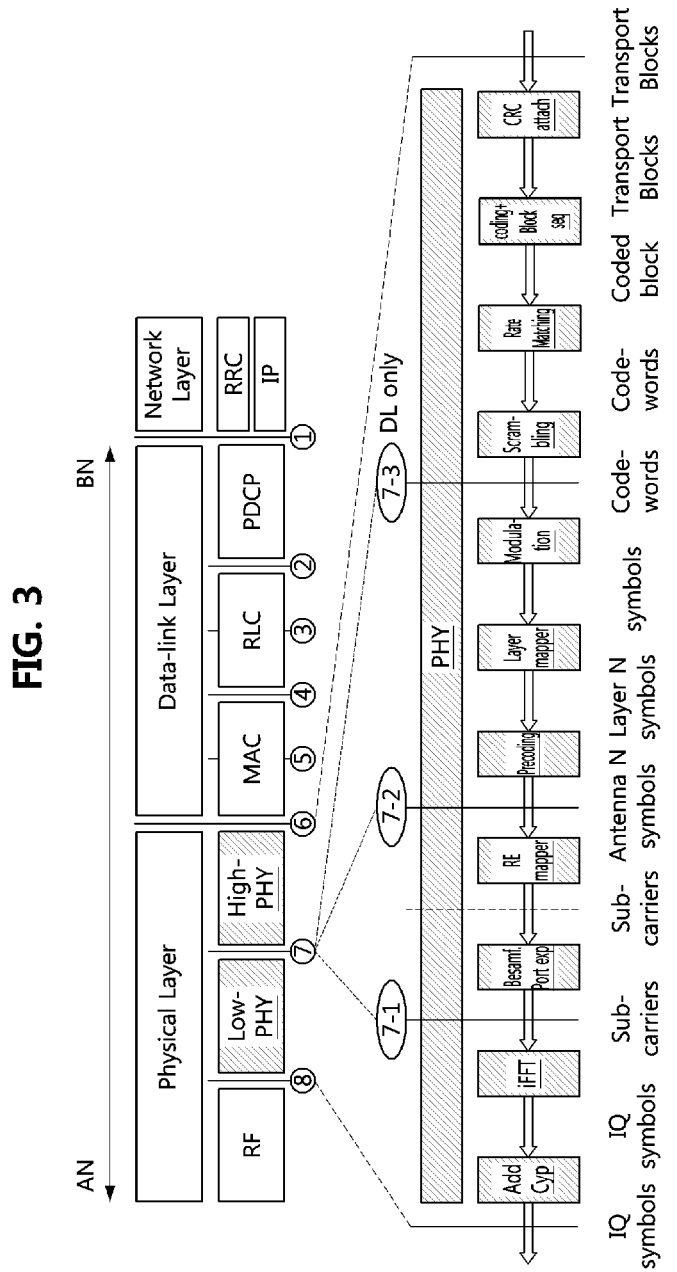
FIG. 3 is a conceptual diagram for describing function splitting of a base station.

FIG. 3 is a conceptual diagram for describing function splitting of a base station.

In the C-RAN architecture according to various exemplary embodiments of the present disclosure, functional operations of distributed access nodes (hereinafter referred to as 'ANs') including a low-level PHY function in an existing RRH, and functional operations of centralized base nodes (hereinafter referred to as 'BNs') excluding the low-level PHY function in an existing BBU (i.e., the low-level PHY function is moved to the AN) will be proposed. Accordingly, the AN may perform an antenna and RF processing function and the low-level PHY function, and the BN may be centralized to perform baseband processing including the high-level PHY function (i.e., high-level PHY, MAC, and upper layers on a radio protocol stack). Meanwhile, a pool of the centralized BNs may correspond to the CP described above.

Referring to FIG. 3, various options (i.e., options 1 to 8) may exist according to a position of a function splitting point between the AN and the BN, and in particular, the option 7 may be subdivided into options 7-1, 7-2, and 7-3.

In the exemplary embodiments of the present disclosure, the option 7-2 may be considered among the various function splitting options shown in FIG. 3. The function splitting option 7-2 may require only a relatively small fronthaul transmission capacity compared to the function splitting option 8 applied to the existing RRH described with reference to FIG. 1, and thus, compression of the fronthaul transmission signal may be unnecessary.

Further, each of the distributed ANs according to the exemplary embodiments of the present disclosure uses a large-scale array antenna, but RF chains that are smaller than the number of antenna elements of the array antenna may be used. This AN configuration may reduce the number of expensive RF chains each composed of a digital-to-analog converter (DAC), a power amplifier, a mixer, etc. when using the millimeter wave and/or terahertz frequency band as well as the low frequency band, and realize cost-effective implementation of the ANs by limiting the number of RF chains to a relatively smaller number than the number of antenna elements. In addition, efficient signal processing may be performed by adjusting phase values of signals transmitted through a plurality of antenna elements connected to individual RF chains through low-cost phase shifters.

Figure 4:
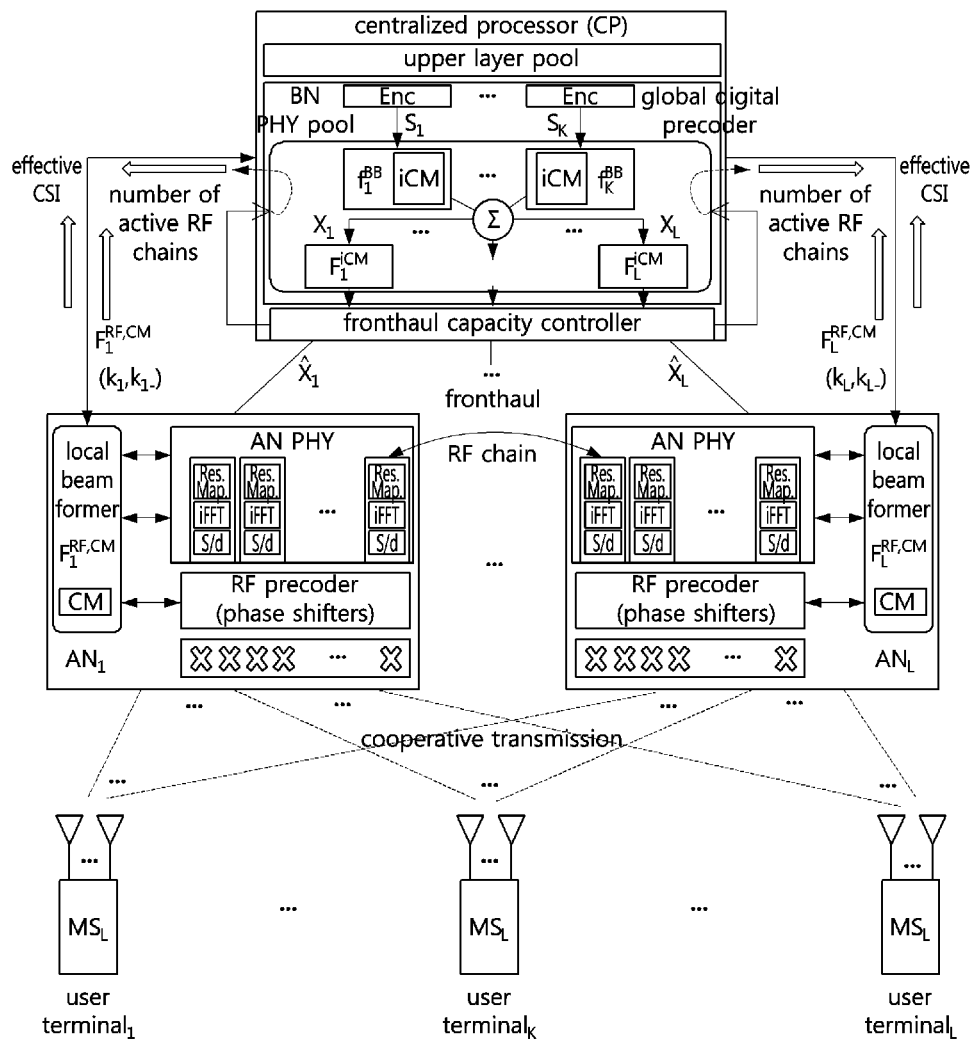
FIG. 4 is a conceptual diagram illustrating a C-RAN architecture for performing hybrid beamforming-based cooperative transmission according to an exemplary embodiment of the present disclosure.

FIG. 4 is a conceptual diagram illustrating a C-RAN architecture for performing hybrid beamforming-based cooperative transmission according to an exemplary embodiment of the present disclosure.

Referring to FIG. 4, the C-RAN architecture according to an exemplary embodiment of the present disclosure is shown, which is composed of distributed ANs and centralized BNs that are functionally split as described above. As described above, the BNs that are centralized and configured as a pool in one site may be referred to as a centralized processor (CP). Hereinafter, a method of providing a service to given terminals at the same time (i.e., using the same time and frequency resources) by utilizing all distributed ANs connected to the CP through fronthaul links will be described.

The number of terminals to be serviced at the same time is assumed to be less than or equal to the total number of RF chains installed in the distributed ANs. When the number of terminals to be serviced at the same time is larger than the total number of RF chains, scheduling for the terminals may be performed using orthogonal resources through time division multiplexing (TDM) or frequency division multiplexing (FDM). For convenience of explanation, in the exemplary embodiments of the present disclosure, only the case where the number of terminals to be simultaneously serviced is less than or equal to the total number of RF chains is considered.

For detailed description, the number of antennas and the number of RF chains of an l-th $AN^{l \in \{1,2,\ldots,L\}}$ may be represented by $N_l$ and $O_l (<N_l)$, respectively. The total number of terminals to be serviced at the same time is indicated by K, and $K \leq \Sigma_{l=1}^{L} O_l$ is assumed. Since the exemplary embodiments of the present disclosure focus on a transmission aspect through cooperation of the distributed ANs in the C-RAN, the individual terminal is assumed to have a single antenna as a reception antenna. However, a transmission scheme according to the exemplary embodiments of the present disclosure may be easily applied to terminals having a plurality of antennas.

In the exemplary embodiments of the present disclosure, a spatial channel covariance matrix $R_{k,l} = \mathbb{E}[h_{k,l} h^*_{k,l}]$, $\forall k \in \{1,2,\ldots,K\}$ of the $AN^{l \in \{1,2,\ldots,L\}}$ and all the terminals is assumed to be known to the corresponding AN through covariance estimation for a hybrid structure. The spatial channel covariance is a long-term channel statistical information and is easy to estimate because it varies according to a long time scale compared to an instantaneous channel. Also, since the spatial channel covariance is uniform across all subcarriers, it may be used for a purpose of designing one analog precoder for all subcarriers. Accordingly, in the exemplary embodiments of the present disclosure, an analog precoder (or, RF precoder) may be designed by using the spatial channel covariance of each user terminal for an entire channel matrix. The exemplary embodiments of the present disclosure focus on downlink transmission. However, actual channel estimation and channel covariance estimation are related to uplink operations, and uplink function splitting may be configured independently of downlink function splitting. The channel covariance estimation may also be performed by the CP. In this case, the calculation for the RF precoder design may be performed in the CP, and the calculated precoder values may be transferred to the ANs. In the following exemplary embodiments, details are described under the assumption that channel covariance estimation is performed in the AN.

$R_{k,l} = U_{k,l} \Lambda_{k,l} U_{k,l}^H$ may be established through eigen decomposition of the channel covariance matrix. Here, $U_{k,l}$ is an eigenvector matrix of $R_{k,l}$, and $\Lambda_{k,l}$ is a diagonal matrix having non-zero eigenvalues of $R_{k,l}$. In this case, a channel $h_{k,l}$ may be expressed as $h_{k,l} = U_{k,l} \Lambda_{k,l}^{1/2} w_{k,l}$. Here, $w_{k,l}$ is a random vector having independent-identically distributed complex Gaussian elements with an average of 0 and a variance of 1, and represents randomness due to small-scale multipath fading components.

Meanwhile, a fronthaul capacity controller shown in FIG. 4 may be a component performing a role of controlling each AN to deactivate at least part of RF chains thereof when it is necessary to reduce the fronthaul link capacity required between the AN(s) and the CP. This will be described later with reference to FIG. 7.

Figure 5:
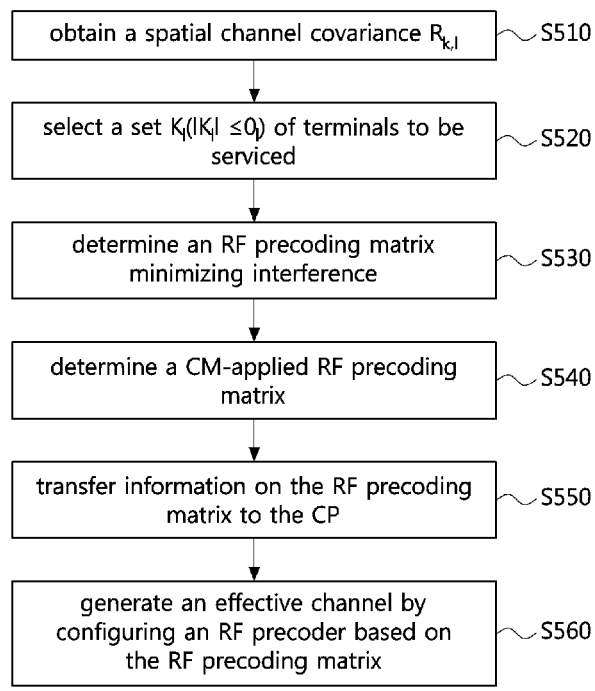
FIG. 5 is a flowchart illustrating an operation method of an AN of a C-RAN architecture according to an exemplary embodiment of the present disclosure.

FIG. 5 is a flowchart illustrating an operation method of an AN of a C-RAN architecture according to an exemplary embodiment of the present disclosure.

Referring to FIG. 5, an individual AN (e.g., AN 1) may obtain a spatial channel covariance $R_{k,l}$ with all terminals subject to a service (S510). In this case, $R_{k,l}$ may be obtained through measurement of an angle of departure (AoD) or angle of arrival (AoA) and measurement of a path loss. The maximum number of terminals that the individual AN can simultaneously provide the service may correspond to the number of RF chains $O_l$ owned by the AN 1. Accordingly, when the number of terminals that can be detected by the AN 1 is greater than $O_l$, the AN may select a set of terminals $\mathcal{K}_l$ ($|\mathcal{K}_l| \leq O_l$) to be simultaneously serviced (S520). Various methods may be used to select the terminals to be serviced, and the terminals to be serviced may be selected depending on whether or not a good quality (i.e., high quality) signal can be provided by the AN 1 to a corresponding terminal. In an exemplary embodiment, $\mathcal{K}_l$ may be configured by selecting terminals having the largest eigenvalues based on major eigenvalues of $R_{k,l}$, $\forall k$. In another exemplary embodiment, $\mathcal{K}_l$ may be configured by selecting terminals having the largest value by comparing $\mathrm{Tr}(R_{k,l})$, $\forall k$ values (i.e., diagonal sums of $R_{k,l}$ (equal to a sum of eigenvalues)). In general, the total number of RF chains provided by all the distributed ANs and the total number of terminals satisfy $K \leq \Sigma_{i=1}^{L} O_l$, and a specific terminal may be served by a plurality of ANs. Meanwhile, there may be a case in which a terminal having a relatively low main eigenvalue is not selected by any AN. In this case, $\mathcal{K}_l$ may be adjusted through centralized scheduling of the CP.

Each AN may calculate an RF precoding vector $F_{k,l}^{RF}$, $k \in \mathcal{K}_l$ for a terminal k to be serviced. In this case, an RF precoding matrix $F_l^{RF}$ having the RF precoding vectors as columns thereof may be determined in order to minimize interference between the terminals belonging to $\mathcal{K}_l$ (S530). As an exemplary embodiment for deriving the RF precoding matrix, the RF precoding matrix may be derived through low-complexity non-repetitive block diagonalization. First, the AN 1 may obtain $R_{k,l} = U_{k,l} \Lambda_{k,l} U_{k,l}^H$ by perform eigen decomposition of $R_{k,l}$, $k \in \mathcal{K}_l$. For $k \in \mathcal{K}_l$, an interference (co-user channel) subspace of the terminal may be configured as shown in Equation 1 below.

$$U_{k-} = [U_{1,l}^*, \ldots, U_{k-1,l}^*, U_{k+1,l}^*, \ldots, U_{|\mathcal{K}_l|,l}^*] \in \mathbb{C}^{N_l \times \sum_{j \in \mathcal{K}_l, j \neq k} r_j^*} \quad \text{[Equation 1]}$$

Here, $U_j^*$ is a matrix composed of $r_j^*(\leq r_j)$ major eigenvectors smaller than a rank $r_j$ of $U_j$. The left eigenspace consisting of the n weakest eigen modes obtained through singular decomposition of $U_{k-}$ may be denoted as $E_{k-} \in \mathbb{C}^{N_l \times n}$. That is, $E_{k-}$ consists of the n weakest left eigenvectors of $U_{k-}$. Then, a signal channel subspace $U_{k,l}$ of the terminal $k \in \mathcal{K}_l$ is projected onto the space $E_{k-}$, so the $U_{k+} = (E_{k-})^H U_{k,l}$ is derived, and $E_{k+} \in \mathbb{C}^{n \times 1}$ consisting of the strongest left eigenvector of $U_{k+}$ may be derived. Finally, the RF precoding vector $F_{k,l}^{RF}$, $k \in \mathcal{K}_l$ may be calculated as in Equation 2.

$$F_{k,l}^{RF} = E_{k-} E_{k+} \in \mathbb{C}^{n \times 1} \quad \text{[Equation 2]}$$

By calculating the RF precoding vector as described above, the transmission subspace of terminal k may be adjusted to its own channel while making it as orthogonal as possible to the interfering co-user channel space. $F_{j,l}^{RF}$ may be calculated for another terminal $j(\neq k)$ belonging to $\mathcal{K}_l$ through the same procedure. When each of the precoding vectors is configured as a column, the RF precoding matrix $F_l^{RF}$ may be derived.

The calculated RF precoding vector may not be directly applied to an RF precoder composed of only phase shifters. To this end, a 'constant modulus (CM)'—applied RF precoding vector $F_l^{RF,CM}$ and a CM-applied RF precoding matrix $F_l^{RF,CM}$ may be calculated (S540). As an exemplary embodiment, the CM-applied RF precoding matrix $F_l^{RF,CM}$ that minimizes a difference between the RF precoding matrix $F_l^{RF}$ and a matrix satisfying a CM constraint may be derived. That is, the size of each element of $F_l^{RF,CM}$ is set to a constant value $$\frac{1}{\sqrt{N_l}},$$

and its phase may be set to a phase $\angle ([F_l^{RF}]_{i,j})$ of each element of $F_l^{RF}$. For example, $[F_l^{RF}]_{i,j}$ is as shown in Equation 3 below.

$$[F_l^{RF,CM}]_{i,j} = \frac{1}{\sqrt{N_l}} e^{j \angle ([F_l^{RF}]_{i,j})} \quad \text{[Equation 3]}$$

Considering the RF precoder hardware constraint as described above, co-user interference may remain. In order to solve this problem, each AN may transfer the calculated CM-applied RF precoding matrix $F_l^{RF,CM}$ to the CP (S550), thereby further removing co-user interference when the digital precoder design is performed by the CP. Each AN may generate an effective channel $\hat{H}^H = H^H F_l^{RF,CM}$ with a reduced dimensions by applying $F_l^{RF,CM}$ to the RF precoder (S560).

Figure 6:
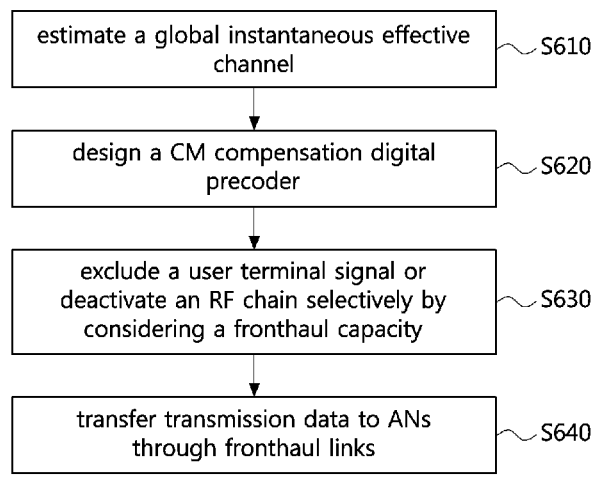
FIG. 6 is a flowchart illustrating an operation method of a CP in a C-RAN architecture according to an exemplary embodiment of the present disclosure.

FIG. 6 is a flowchart illustrating an operation method of a CP in a C-RAN architecture according to an exemplary embodiment of the present disclosure.

In the exemplary embodiments of the present disclosure, it is assumed that the terminal k is allocated its own uplink pilot sequence and periodically transmits an uplink pilot, and the distributed ANs receive uplink pilot sequences of the terminals and transfer them to the CP. The pilot signal of the terminal may be received through the RF precoders of the distributed ANs, and the CP may process the received pilot signal to estimate an uplink channel. In this case, the estimated uplink channel information may be used as downlink channel information according to channel reciprocity.

In the present disclosure, $\hat{H}_k = [\hat{H}_{k,1}^T, \ldots, \hat{H}_{k,L}^T]^T$ is denoted as effective channels from all the ANs to the terminal k. Here, $\hat{H}_{k,l}$ is an effective channel from the AN l to the terminal k. The CP may process the pilot signals received from the distributed ANs, and estimate a global instantaneous effective channel $\overline{H} = [\hat{H}_1^H, \ldots, \hat{H}_K^H]^H$ (S610). The RF precoder matrix $\overline{H} = [\hat{H}_1^H, \ldots, \hat{H}_K^H]^H$ in the CP, which has the RF precoder matrices $F_l^{RF,CM}$ of the distributed ANs as diagonal elements, may be configured as shown in Equation 4.

$$F^{RF,CM} = \begin{bmatrix} F_1^{RF,CM} & 0_{N_1 \times O_2} & \cdots & 0_{N_1 \times O_L} \\ 0_{N_2 \times O_1} & F_2^{RF,CM} & \cdots & 0_{N_2 \times O_L} \\ \vdots & \vdots & \ddots & \vdots \\ 0_{N_L \times O_1} & 0_{N_L \times O_2} & \cdots & F_L^{RF,CM} \end{bmatrix} \quad \text{[Equation 4]}$$

The global instantaneous effective channel at the CP is $\overline{H} = H^H F^{RF,CM}$. Here H is an antenna-level channel of the distributed ANs. After configuring the global instantaneous effective channel, various digital precoders may be designed. As an exemplary embodiment, a digital precoder may be designed in a regular zero forcing (RZF) scheme. The digital precoder according to the RZF scheme may be given as Equation 5 below.

$$F^{RZF} = [f_1^{RZF}, \ldots, f_K^{RZF}] = (\overline{H}^H \overline{H} + \beta I)^{-1} \overline{H}^H = \quad \text{[Equation 5]}$$
$$((F^{RF,CM})^H H H^H F^{RF,CM} + \beta I)^{-1} (F^{RF,CM})^H H =$$
$$C^{-1} \overline{H}^H = C^{-1} (F^{RF,CM})^H H$$

Here, $C = \overline{H}^H \overline{H} + \beta I$, $\beta = K/\rho$ is a normalization parameter, and $\rho$ is a transmission SNR.

In the description of the AN operation above, the RF precoder is designed to have a constant amplitude due to the AN's RF precoder hardware constraints (i.e., precoding control with only phase shifters). Accordingly, the RF precoder constraints of the ANs viewed from the CP may be compensated (S620). Hereinafter, this is referred to as 'constant modulus compensation' (inverse CM, hereinafter referred to as 'iCM'), and basically, the RF precoder of the AN viewed from the CP may be expressed as a product of two semi-unitary matrices (i.e., $U^H U = U U^H = I$). To this end, $F_l^{RF,CM} = U_{CM} D_{CM} V_{CM}^H$ may be obtained by performing singular decomposition of the CM-applied RF precoder matrix $F_l^{RF,CM}$ received from the AN l, and through this, a CM compensation matrix $F_l^{iCM}$ may be determined as in Equation 6 below so that $F_l^{RF,CM} F_l^{iCM} = U_{CM} V_{CM}^H$ is established.

$$F_l^{iCM} = V_{CM} D_{CM}^{-1} V_{CM}^H \quad \text{[Equation 6]}$$

Accordingly, the constant modulus compensation RF precoder matrix $F^{RF}$ viewed from the CP may be determined as shown in Equation 7.

$$F^{RF} = \begin{bmatrix} F_1^{RF,CM} F_1^{iCM} & 0_{N_1 \times O_2} & \cdots & 0_{N_1 \times O_L} \\ 0_{N_2 \times O_1} & F_2^{RF,CM} F_2^{iCM} & \cdots & 0_{N_2 \times O_L} \\ \vdots & \vdots & \ddots & \vdots \\ 0_{N_L \times O_1} & 0_{N_L \times O_2} & \cdots & F_L^{RF,CM} F_L^{iCM} \end{bmatrix}$$ [Equation 7]

Accordingly, the global instantaneous effective channel viewed from the CP is $\overline{H}_{iCM} = H^H F^{RF}$, and the RZF precoder matrix $F_{iCM}^{BB}$ may be determined as shown in Equation 8 below.

$$F_{iCM}^{BB} = [f_1^{BB}, \ldots, f_K^{BB}] = (\overline{H}_{iCM}^H \overline{H}_{iCM} + \beta I)^{-1} \overline{H}_{iCM}^H$$ [Equation 8]

In addition, the precoded signal transmitted by the CP may be configured as shown in Equation 9.

$$x = [x_1^H, \ldots, x_L^H]^H = \sum_{k=1}^{K} f_k^{BB} s_k$$ [Equation 9]

Here, $s_k$ is a signal to be transmitted to the terminal k through all the ANs, $f_k^{BB} \in \mathbb{C}^{\Sigma_{i=1}^L N_i \times 1}$ is a vector for precoding $s_k$, $x_l \in \mathbb{C}^{O_l \times 1}$ is an l-th partial vector of a signal x before iCM corresponding to a signal transmitted by the AN l is applied. In order to extract $x_l$, an l-th form matrix $\mathcal{S}_l$ may be defined as in Equation 10.

$$\mathcal{S}_l = [0_{O_l \times \Sigma_{i=1}^{l-1} O_i^H} I_{O_l} 0_{O_l \times \Sigma_{i=l+1}^{L} O_i^H}]^H$$ [Equation 10]

Through the l-th form matrix $\mathcal{S}_l$, $x_l = \Sigma_{k=1}^{K} \mathcal{S}_l^H f_k^{BB} s_k$ may be extracted. Now, a signal $\hat{x}_l$ to be transmitted through the fronthaul link connected to the AN l may be generated as shown in Equation 11 through the corresponding iCM processing.

$$\hat{x}_l = F_l^{iCM} x_l$$ [Equation 11]

In Equation 9, a signal to be transmitted through an individual fronthaul link is a linear combination signal obtained by linearly combining signals of all users served by the entire system. The low-level PHY function and the RF precoding may be performed on the linear combination signal, and the linear combination signal may be transmitted through a wireless link. In the exemplary embodiments of the present disclosure, the digital precoding may be performed in the CP and the remaining low-level PHY functions may be performed in the AN connected through the fronthaul link (i.e., function splitting option 7-2 in FIG. 3). Particularly, unlike the conventional RRH structure in which a time-domain I/Q output signal of an inverse fast Fourier transform (IFFT) module is transmitted through the fronthaul link (i.e., function splitting option 8 in FIG. 3), the IFFT module function is performed in the AN, and thus, the signal transmitted through the fronthaul link is a frequency-domain I/Q signal, which has a transmission rate of ⅛ times that of the time-domain I/Q signal.

In order to further reduce the fronthaul capacity required for connection between the CP and the distributed ANs, in the exemplary embodiments of the present disclosure, each fronthaul transmission is considered when user data $s_k$, $k \in \{1, \ldots, K\}$ to be transmitted are linearly combined, and signals of users that are not affected by the transmission of the AN connected to the corresponding fronthaul link may be excluded from the linear combination. A detailed description thereof is described with reference to FIG. 7.

Figure 7:
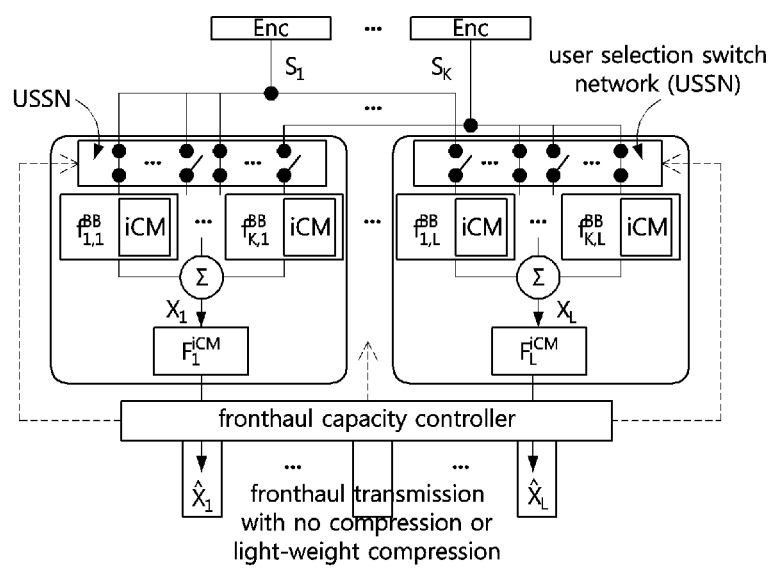
FIG. 7 is a conceptual diagram illustrating a digital precoder combined with a user selection switch network for fronthaul transmission with no compression or light-weight compression according to an exemplary embodiment of the present disclosure.

FIG. 7 is a conceptual diagram illustrating a digital precoder combined with a user selection switch network for fronthaul transmission with no compression or light-weight compression according to an exemplary embodiment of the present disclosure.

The CP may configure a digital precoder $F_{iCM,i}^{BB}$ for the AN l as in Equation 12 by using Equations 8 and 10.

$$F_{iCM,l}^{BB}[f_{1,l}^{BB}, \ldots, f_{K,l}^{BB}] = \mathcal{S}_l^H (\overline{H}_{iCM}^H \overline{H}_{iCM} + \beta I)^{-1} \overline{H}_{iCM}^H$$ [Equation 12]

Meanwhile, when it is necessary to reduce the fronthaul link capacity required between the AN l and the CP, the CP may identify a user terminal signal having a small influence on the linear combination signal to be transmitted through the fronthaul link connected to the AN l, and exclude the corresponding signal from the linear combination signal. When the entire terminal set is denoted as $\mathcal{K} = \{1, \ldots, K\}$, the user terminal signal having a small influence may be selected based on a set $\mathcal{K}_{l-} = \mathcal{K} - \mathcal{K}_l$ of terminals not included in the set $\mathcal{K}_l$ selected in the step S520 of FIG. 5. In an exemplary embodiment, after sorting the terminals belonging to $\mathcal{K}_{l-}$ in the descending order of $\text{Tr}(R_{k,l})$ values, switch(es) of a user selection switch network (USSN) may be controlled in the sorted order, so that signal(s) of the selected terminal(s) are excluded from the linear combination signal. This process may be repeated until transmission data for ANs can be transferred with a given fronthaul capacity or until no terminal exists in $\mathcal{K}_{l-}$.

When the given fronthaul capacity is insufficient even if the above process is repeated until no terminal exists in $\mathcal{K}_{l-}$, the CP may control the AN l to perform an operation of deactivating (turning OFF) an RF chain(s) of the AN l. The order of deactivating the RF chains may correspond to the descending order of $\text{Tr}(R_{k,l})$ values of the user terminals belonging to $\mathcal{K}_l$, and the RF chains may be deactivated until transmission data for the ANs can be transferred with the given fronthaul capacity.

Finally, the CP may configure transmission data for the ANs and transfer the configured transmission data to the ANs through the fronthaul links (S640).

Figure 8:
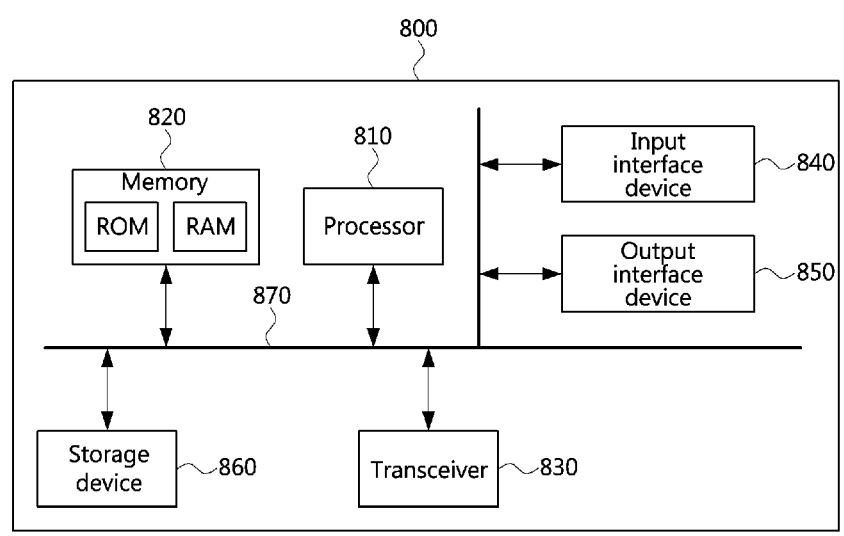
FIG. 8 is a block diagram illustrating a configuration of an apparatus for performing methods according to exemplary embodiments of the present disclosure.

FIG. 8 is a block diagram illustrating a configuration of an apparatus for performing methods according to exemplary embodiments of the present disclosure.

The apparatus illustrated in FIG. 8 may be a communication node (e.g., CP, AN, or terminal) for performing the methods according to the exemplary embodiments of the present disclosure.

Referring to FIG. 8, a communication node 800 may include at least one processor 810, a memory 820, and a transceiver 830 connected to a network to perform communication. In addition, the communication node 800 may further include an input interface device 840, an output interface device 850, a storage device 860, and the like. The components included in the communication node 800 may be connected by a bus 870 to communicate with each other. However, each component included in the communication node 800 may be connected to the processor 810 through a separate interface or a separate bus instead of the common bus 870. For example, the processor 810 may be connected to at least one of the memory 820, the transceiver 830, the input interface device 840, the output interface device 850, and the storage device 860 through a dedicated interface.

The processor 810 may execute at least one instruction stored in at least one of the memory 820 and the storage device 860. The processor 810 may refer to a central processing unit (CPU), a graphics processing unit (GPU), or a dedicated processor on which the methods according to the exemplary embodiments of the present invention are performed. Each of the memory 820 and the storage device 860 may be configured as at least one of a volatile storage medium and a nonvolatile storage medium. For example, the memory 820 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first access node (AN) for a hybrid beamforming-based cooperative transmission in a cloud radio access network (C-RAN), the operation method comprising:
   obtaining a spatial channel covariance with terminals subject to a service;
   selecting a set of terminals to be serviced from among the terminals subject to the service;
   determining a radio frequency (RF) precoding matrix by which interference between the terminals to be serviced is minimized;
   transferring information on the determined RF precoding matrix to a centralized processor (CP); and
   generating an effective channel by configuring an RF precoder based on the determined RF precoding matrix.

2. The operation method according to claim 1, wherein the spatial channel covariance is obtained through measurement of an angle of departure (AoD) or an angle of arrival (AoA), and measurement of a path loss.

3. The operation method according to claim 1, wherein the set of the terminals to be serviced is selected from among the terminals subject to the service according to whether each terminal is capable of being provided a high-quality signal from the first AN.

4. The operation method according to claim 1, wherein the RF precoding matrix is a matrix including RF precoding vectors for respective terminals belonging to the set as columns thereof, which minimizes interference between the terminals belonging to the set.

5. The operation method according to claim 1, further comprising, when the RF precoder is configured only with phase shifter(s), converting the determined RF precoding matrix to an RF precoding matrix to which a constant modulus (CM) is applied,
   wherein information on the RF precoding matrix to which the CM is applied is transferred to the CP, and the RF precoder is configured based on the RF precoding matrix to which the CM is applied.

6. The operation method according to claim 1, wherein the information on the determined RF precoding matrix transferred to the CP is applied to digital precoder design performed in the CP.

7. The operation method according to claim 1, wherein when a fronthaul link capacity required between the first AN and the CP needs to be reduced, a linear combination signal to be transmitted through the first AN is received from the CP by excluding signals for at least a portion of the terminals to be serviced therefrom.

8. The operation method according to claim 1, wherein when a fronthaul link capacity required between the first AN and the CP needs to be reduced, at least a portion of RF chains of the first AN are deactivated by a control of the CP.

9. An operation method of a centralized processor (CP) for a hybrid beamforming-based cooperative transmission in a cloud radio access network (C-RAN), the operation method comprising:
   estimating a global instantaneous effective channel between terminals and access nodes (ANs), the ANs being connected to the CP;
   designing a digital precoder based on the global instantaneous effective channel; and
   transferring transmission data for each of the ANs, to which the digital precoder is applied, to each of the ANs through a fronthaul link,
   wherein the CP receives an uplink pilot sequence transmitted by each of the terminals through the ANs, and processes the received uplink pilot sequence to estimate the global instantaneous effective channel, and the global instantaneous effective channel is used as downlink channel information between the ANs and the terminals.

10. The operation method according to claim 9, wherein the digital precoder is designed in a regular zero forcing (RZF) scheme.

11. The operation method according to claim 9, further comprising receiving information on a radio frequency (RF) precoding matrix from each of the ANs,
   wherein when a constant modulus (CM) is applied to the RF precoding matrix, the digital precoder is designed by performing an inverse CM (iCM).

12. The operation method according to claim 9, further comprising, when a fronthaul link capacity required between a first AN among the ANs and the CP needs to be reduced, excluding signals for at least a portion of terminal(s) from a linear combination signal to be transmitted through the first AN.

13. The operation method according to claim 9, further comprising, when a fronthaul link capacity required between a first AN among the ANs and the CP needs to be reduced, controlling the first AN to deactivate at least a portion of RF chains of the first AN.

14. A cloud radio access network (C-RAN) system for performing a hybrid beamforming-based cooperative transmission, the C-RAN system comprising:
   a centralized processor (CP);
   access nodes (ANs) connected to the CP; and
   fronthaul links connecting the CP and the ANs, wherein the CP is configured to: estimate a global instantaneous effective channel between terminals and the ANs, design a digital precoder based on the global instantaneous effective channel, and transfer transmission data for each of the ANs, to which the digital precoder is applied, to each of the ANs through a fronthaul link, and wherein each of the ANs is configured to: obtain a spatial channel covariance with terminals subject to a service, select a set of terminals to be serviced from among the terminals subject to the service; determine a radio frequency (RF) precoding matrix by which interference between the terminals to be serviced is minimized; transfer information on the determined RF precoding matrix to the CP, and generate an effective channel by configuring an RF precoder based on the determined RF precoding matrix.

15. The C-RAN system according to claim 14, wherein the RF precoding matrix is a matrix including RF precoding vectors for respective terminals belonging to the set as columns thereof, which minimizes interference between the terminals belonging to the set.

16. The C-RAN system according to claim 14, wherein when the RF precoder is configured only with phase shifter(s), the determined RF precoding matrix is converted to an RF precoding matrix to which a constant modulus (CM) is applied, information on the RF precoding matrix to which the CM is applied is transferred to the CP, and the RF precoder is configured based on the RF precoding matrix to which the CM is applied.

17. The C-RAN system according to claim 16, wherein the CP receives information on the determined RF precoding matrix from each of the ANs, and design the digital precoder by performing an inverse constant modulus (iCM) when a CM is applied to the determined RF precoding matrix.

18. The C-RAN system according to claim 14, wherein the CP receives an uplink pilot sequence transmitted by each of the terminals through the ANs, and processes the received uplink pilot sequence to estimate the global instantaneous effective channel, and the global instantaneous effective channel is used as downlink channel information between the ANs and the terminals.

19. The C-RAN system according to claim 14, wherein the digital precoder is designed in a regular zero forcing (RZF) scheme.

* * * * *